US009254918B2

(12) United States Patent
Young et al.

(10) Patent No.: US 9,254,918 B2
(45) Date of Patent: Feb. 9, 2016

(54) AIRCRAFT AISLE PARTITION WITH SWINGING DOORS

(71) Applicant: C&D Zodiac, Inc., Huntington Beach, CA (US)

(72) Inventors: William Wai-Loong Young, Long Beach, CA (US); Glen A. Noda, Irvine, CA (US); Ian Geoffrey Scoley, Huntington Beach, CA (US); Nicholas Lee, Huntington Beach, CA (US)

(73) Assignee: C&D Zodiac, Inc., Huntington Beach, CA (US)

( * ) Notice: Subject to any disclaimer, the term of this patent is extended or adjusted under 35 U.S.C. 154(b) by 311 days.

(21) Appl. No.: 14/102,473

(22) Filed: Dec. 10, 2013

(65) Prior Publication Data

US 2014/0158826 A1 Jun. 12, 2014

Related U.S. Application Data

(60) Provisional application No. 61/735,947, filed on Dec. 11, 2012.

(51) Int. Cl.
*B64D 13/00* (2006.01)
*B64D 11/00* (2006.01)
*B64D 11/02* (2006.01)
*B64D 11/04* (2006.01)

(52) U.S. Cl.
CPC ............ *B64D 11/0023* (2013.01); *B64D 11/02* (2013.01); *B64D 11/04* (2013.01)

(58) Field of Classification Search
USPC .......................................... 244/118, 5, 129.5
See application file for complete search history.

(56) References Cited

U.S. PATENT DOCUMENTS

| 4,597,549 | A | | 7/1986 | Ryan | |
|---|---|---|---|---|---|
| 4,903,172 | A | * | 2/1990 | Schoniger | G09F 13/20 136/291 |
| 6,659,401 | B1 | * | 12/2003 | Semprini | B64C 1/1469 244/118.5 |
| 8,763,327 | B2 | * | 7/2014 | Harter | E04B 2/74 160/222 |
| 2004/0089766 | A1 | | 5/2004 | Semprini | |
| 2008/0013303 | A1 | | 1/2008 | Guarino | |
| 2009/0224103 | A1 | | 9/2009 | Neumann | |
| 2014/0175219 | A1 | * | 6/2014 | Young | B64D 11/04 244/118.5 |

OTHER PUBLICATIONS

International Search Report and Written Opinion issued on Apr. 24, 2014 in related PCT/US2013/074479 application.

* cited by examiner

*Primary Examiner* — Christopher P Ellis
(74) *Attorney, Agent, or Firm* — Jeffer Mangels Butler & Mitchell LLP; Brennan C. Swain, Esq.

(57) ABSTRACT

A partition configured to be positioned within an aircraft. The partition includes a first divider assembly that includes a first wall portion having a first jamb member secured to an inboard surface thereof and a first door hingedly connected to the first jamb member. The first jamb member includes first lighting that illuminates the first door, and the first door is movable between a stowed position and a deployed position. The partition also includes a second divider assembly that includes a second wall portion having a second jamb member secured to an inboard surface thereof and a second door hingedly connected to the second jamb member. The second jamb member includes second lighting that illuminates the second door, and the second door is movable between a stowed position and a deployed position. The second door is spaced apart from the first door.

12 Claims, 5 Drawing Sheets

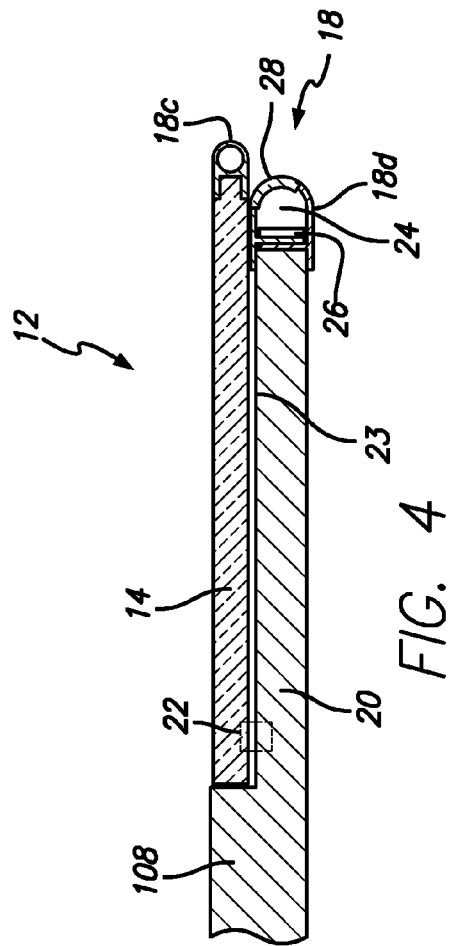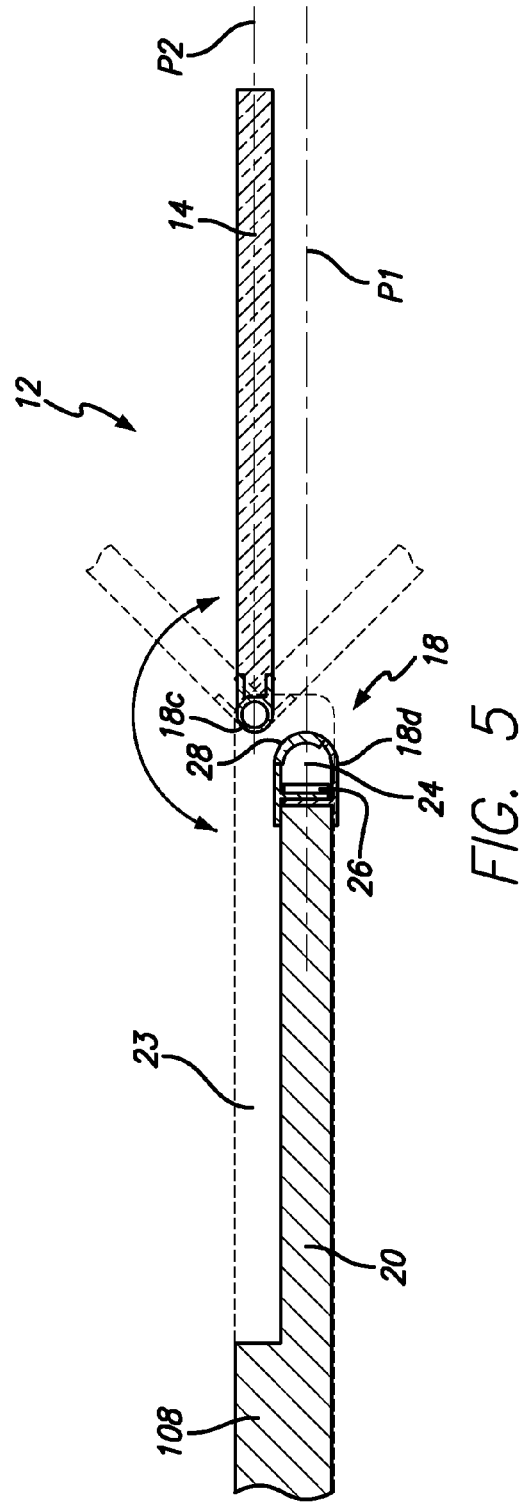

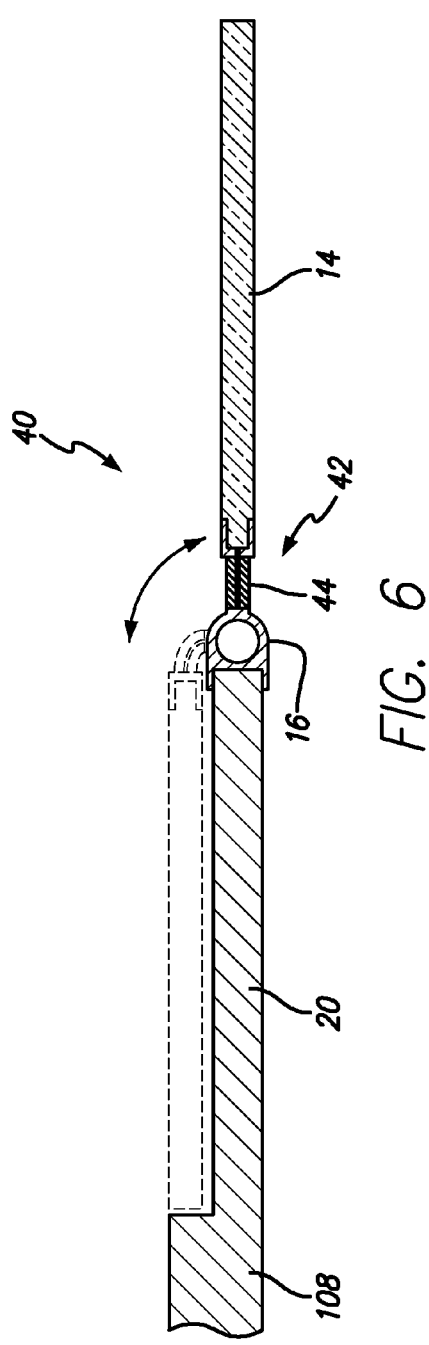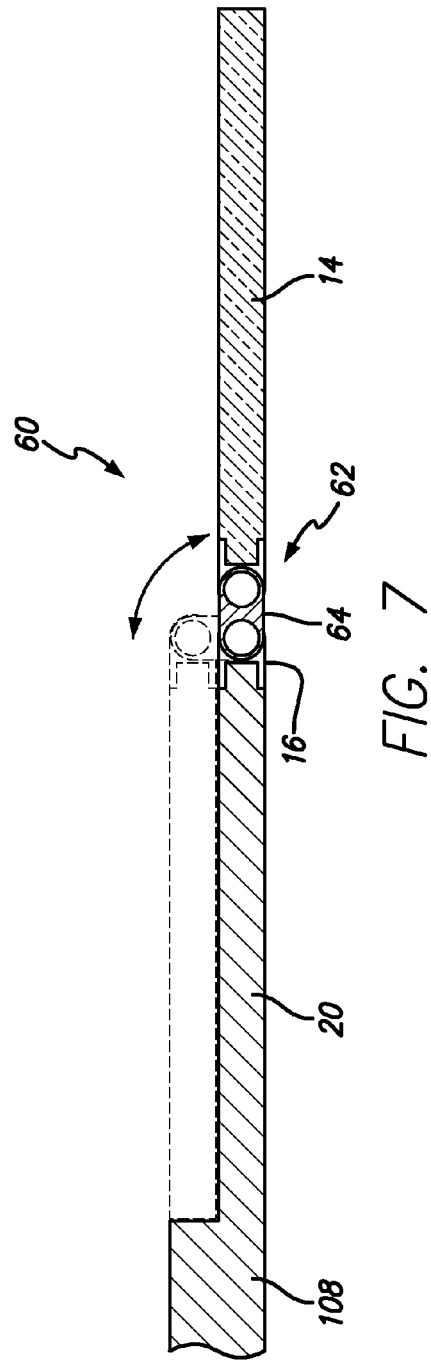

AIRCRAFT AISLE PARTITION WITH SWINGING DOORS

CROSS REFERENCE TO RELATED APPLICATIONS

This application claims the benefit of U.S. Provisional Application No. 61/735,947, filed Dec. 11, 2012, which is herein incorporated by reference in its entirety.

FIELD OF THE INVENTION

The present invention relates generally to a partition for an aircraft, and more particularly to a partition with swinging doors.

BACKGROUND OF THE INVENTION

Aircraft typically include curtains or the like for separating different sections or cabins (e.g., economy, business and first class sections) from one another. However, with increased security measures in recent times, curtains can be a complete block to site lines down the aircraft. Furthermore, curtains are susceptible to odor and spills. Accordingly, a need exists for partitions that can indicate the separation between different sections or cabins of an aircraft, without completely blocking site lines.

SUMMARY OF THE PREFERRED EMBODIMENTS

In accordance with a first aspect of the present invention there is provided a partition configured to be positioned within an aircraft. The partition includes a first divider assembly that includes a first wall portion having a first jamb member secured to an inboard surface thereof and a first door hingedly connected to the first jamb member. The first jamb member includes first lighting that illuminates the first door, and the first door is movable between a stowed position and a deployed position. The partition also includes a second divider assembly that includes a second wall portion having a second jamb member secured to an inboard surface thereof and a second door hingedly connected to the second jamb member. The second jamb member includes second lighting that illuminates the second door, and the second door is movable between a stowed position and a deployed position. The second door is spaced apart from the first door. In a preferred embodiment, the first jamb member includes a vertically extending channel running therethrough in which the first lighting is positioned to direct light toward an outboard surface of the first door. The second jamb member includes a vertically extending channel running therethrough in which the second lighting is positioned to direct light toward an outboard surface of the second door. Preferably, the first and second lighting comprise first and second LED light strips, that are positioned adjacent first and second lenses, respectively.

In a preferred embodiment, the first wall portion defines a center plane and the first door defines a center plane, wherein the center plane of the first wall portion is not aligned with the center plane of the first door when the first door is in the deployed position, wherein the second wall portion defines a center plane and the second door defines a center plane, wherein the center plane of the second wall portion is not aligned with the center plane of the second door when the second door is in the deployed position. Preferably, the first lens is offset from the center plane of the first wall portion and the second lens is offset from the center plane of the first wall portion. In a preferred embodiment, the first wall portion includes a first cut-out defined therein in which the first door is positioned when in the stowed position, and the second wall portion includes a second cut-out defined therein in which the second door is positioned when in the stowed position.

In accordance with another aspect of the present invention there is provided an aircraft that includes an interior that is divided into at least first and second class sections, and a partition that is positioned between the first class section and the second class section. The partition includes a first divider assembly that includes a first wall portion having a first jamb member secured to an inboard surface thereof and a first door hingedly connected to the first jamb member. The first jamb member includes first lighting that illuminates the first door, and the first door is movable between a stowed position and a deployed position. The partition also includes a second divider assembly that includes a second wall portion having a second jamb member secured to an inboard surface thereof and a second door hingedly connected to the second jamb member. The second jamb member includes second lighting that illuminates the second door, and the second door is movable between a stowed position and a deployed position. The second door is spaced apart from the first door. At least a portion of the aisle is defined between the first and second divider walls.

In accordance with yet another aspect of the present invention there is provided a method performed in an aircraft interior that includes a partition that comprises a first divider assembly that includes a first wall portion having a first jamb member secured to an inboard surface thereof and a first door hingedly connected to the first jamb member. The first jamb member includes first lighting that illuminates the first door. The partition further includes a second divider assembly that includes a second wall portion having a second jamb member secured to an inboard surface thereof and a second door hingedly connected to the second jamb member. The second jamb member includes second lighting that illuminates the second door and the second door is spaced apart from the first door. The method includes the steps of moving the first door from a stowed position to a deployed position after the aircraft has passed above a predetermined altitude, moving the second door from a stowed position to a deployed position after the aircraft has passed above a predetermined altitude, moving the first door from the deployed position to the stowed position after the aircraft has passed below a predetermined altitude, and moving the second door from the deployed position to the stowed position after the aircraft has passed below a predetermined altitude. In a preferred embodiment, the method also includes the step of illuminating the first and second doors.

The present invention provides a semi-transparent barrier or partition between sections of a passenger aircraft. In use, the partition can be employed to discourage passengers from moving from one cabin to another during flight, for example to sightsee or to use the front lavatory; to protect the last row of the front cabin customers from disturbances around the lavatory and marketplace; and to create an enticing entrance to the cabin that emphasizes the airline's master brand.

The doors of the present invention provide a translucent but present barrier between two distinct areas (e.g., cabins). Additional lighting effects highlight the area and offer a "gateway" entrance to different areas of the cabin. The present invention provides additional visibility throughout the cabin (over curtains), and a striking aesthetic feature to modernize the look of the cabin.

BRIEF DESCRIPTION OF THE DRAWINGS

FIG. 4 is a cross-section taken along line 4-4 of FIG. 2;

FIG. 5 is a cross-section taken along line 5-5 of FIG. 1;

FIG. 6 is a cross-section of a partition in accordance with another preferred embodiment of the present invention; and FIG. 7 is a cross-section of a partition in accordance with another preferred embodiment of the present invention.

Like numerals refer to like parts throughout the several views of the drawings.

DETAILED DESCRIPTION OF THE PREFERRED EMBODIMENTS

Figure 1:
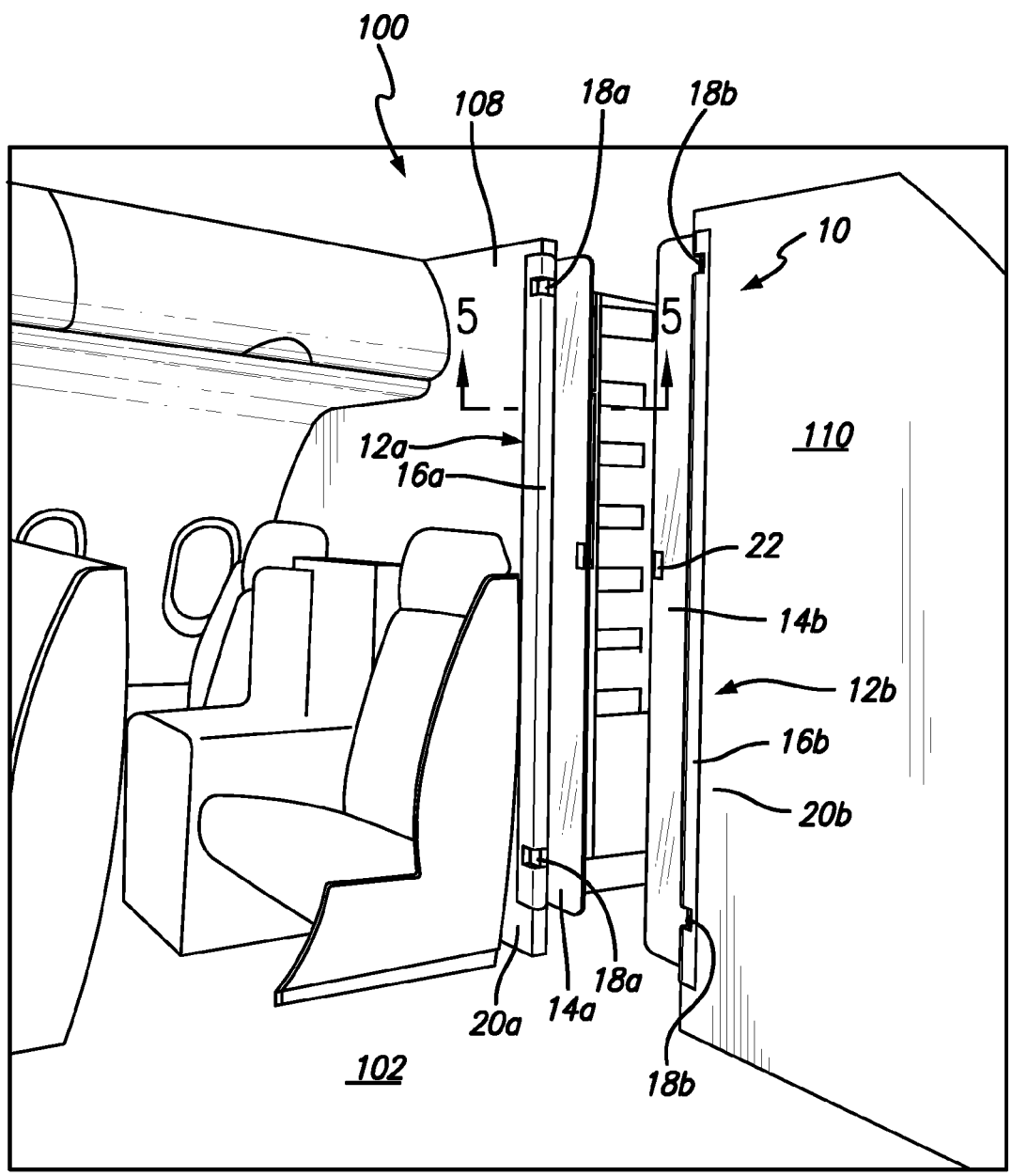
FIG. 1 is a perspective view of a partition positioned between two cabins in an aircraft in accordance with a preferred embodiment of the present invention.
Figure 2:
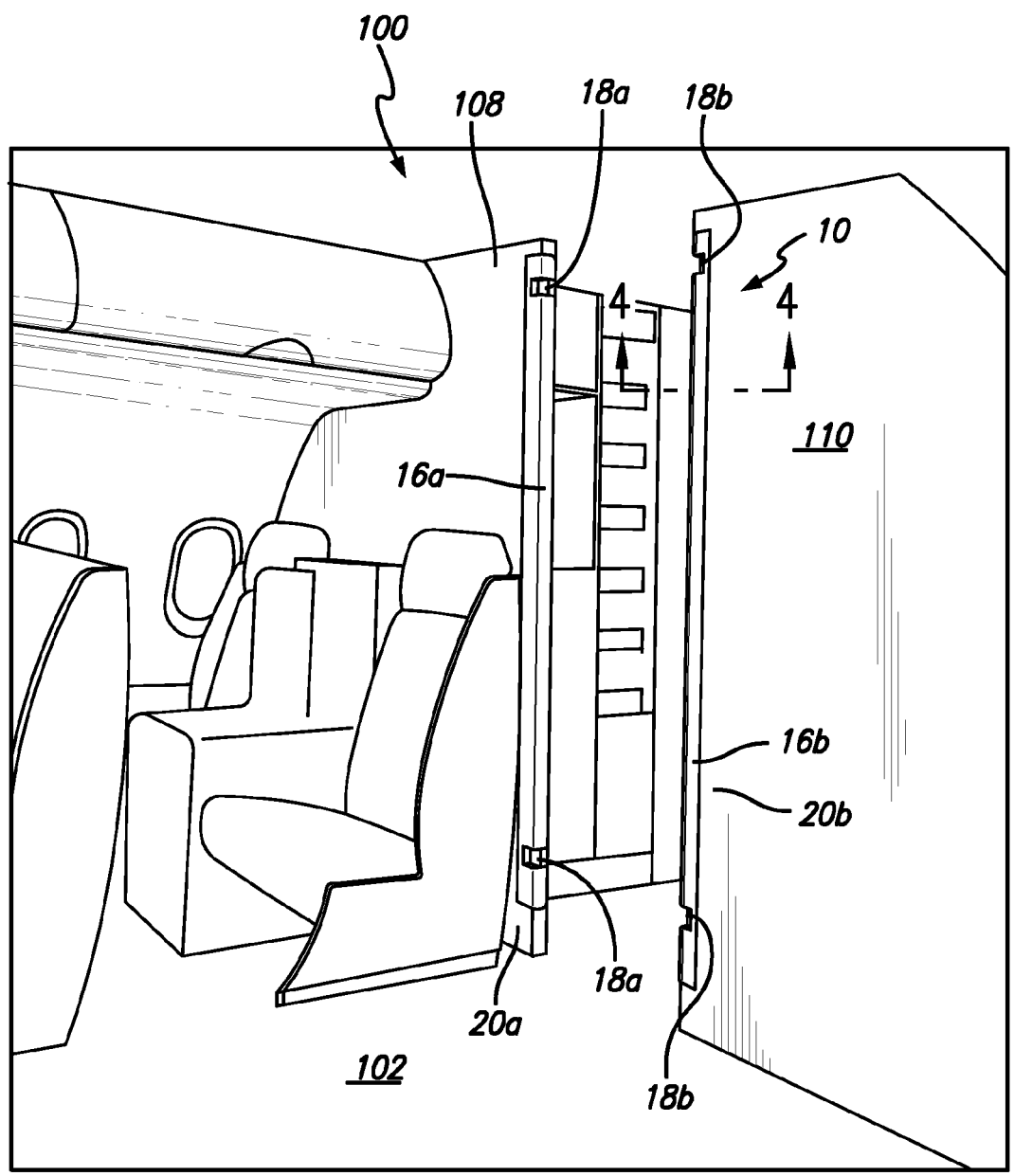
FIG. 2 is a perspective view of the partition of FIG. 1 with the doors in the stowed position.
Figure 3:
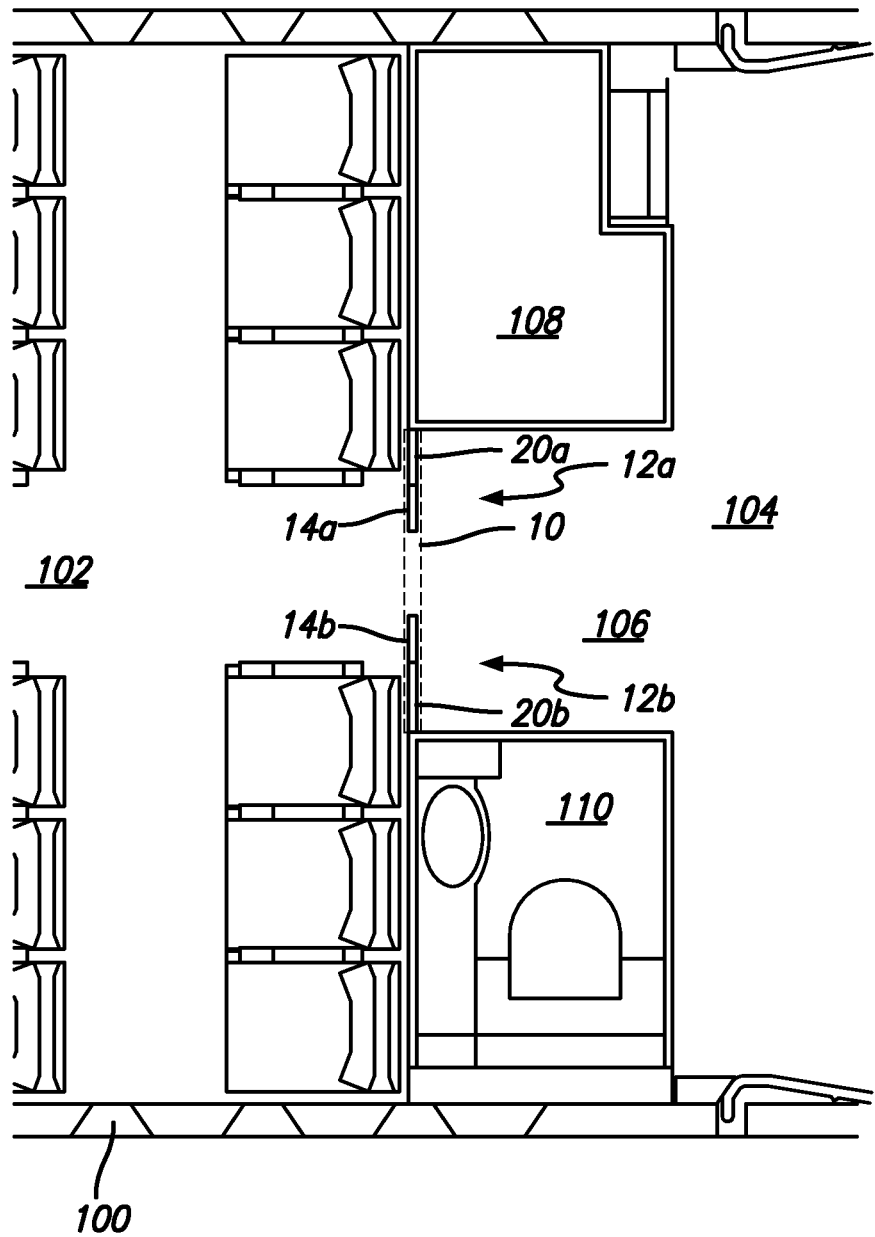
FIG. 3 is a plan view of an aircraft showing a partition positioned between the business class and economy class cabins.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, which are for the purpose of illustrating the present invention and not for purposes of limiting the same, FIGS. 1-7 show preferred embodiments of a partition 10. In particular, the invention can be used on commercial passenger aircraft. However, this is not a limitation on the present invention and the partition can be used elsewhere. Furthermore, the drawings show the partition 10 positioned in the mid cabin of an aircraft 100 between a business class 102 and economy class 104. However, this is not a limitation on the present invention and the partition 10 can be positioned elsewhere.

In a preferred embodiment, the partition 10 includes first and second divider assemblies 12a and 12b. It will be appreciated that the components of the first divider assembly 12a are generally denoted herein with an "a" and components of the second divider assembly 12b are generally denoted with a "b". However, because the components are generally mirror images of one another in some portions of the specification and drawings, the "a" and "b" are omitted. The first and second divider assemblies 12a and 12b each include a door 14a and 14b that is hingedly or otherwise pivotally connected to a wall or monument within the aircraft and swing between a deployed (FIG. 1) and stowed (FIG. 2) position. In a preferred embodiment, the first and second doors 14a and 14b extend at least partially into the aisle 106. As shown in FIG. 1, the first door 14a extends from a marketplace monument 108 and the second door 14b extends from a lavatory monument 110. However, this is not a limitation on the present invention and the first and second doors 14a and 14b can extend from any type of monument (e.g., galley, closet, etc.) or the side wall or other portion of the aircraft interior.

In a preferred embodiment, the doors 14a and 14b comprise a translucent or transparent material (e.g., PVC, acrylic/PVC alloyed thermoplastic or the like) and the divider assemblies 12a and 12b include lighting. Any translucent or transparent material is within the scope of the invention. Furthermore, a mesh can also be used. Also, a protective coating can be applied to the doors 14a and 14b to prevent chipping or scratching. It will be appreciated that in use, the lighting provides illumination to the door 14 for an aesthetic effect and to provide a demarcation between the cabins. However, this is not a limitation on the present invention, and the doors 14a and 14b can be made of any desired material or may not be lit.

FIGS. 1-5 show a first embodiment of partition 10. FIGS. 4-5 show a cross-section of one of the divider assemblies 12 in the stowed (FIG. 4) and deployed (FIG. 5) positions. It will be appreciated that the other divider assembly 12 and components thereof are a mirror image of the divider assembly 12 shown in FIGS. 4-5. Generally, the divider assembly 12 includes door 14, a jamb member 16 and a hinge assembly 18 that hingedly connects the door 14 to the jamb member 16, which is secured to a wall portion 20 that extends from marketplace monument 108. Any type of hinge assembly is within the scope of the present invention. In the embodiment shown in FIGS. 4-5, the hinge assembly 18 includes a door portion 18c, a jamb portion 18d and the appropriate pins, spring or cam mechanism, etc. therebetween to allow the door 14 to move between the deployed and stowed positions. As shown in FIG. 5, in a preferred embodiment, the door 14 is offset from the wall portion 20 and jamb member 16. In other words, wall portion 20 defines a center plane P1 and the door defines a center plane P2, and center plane P1 is not aligned with center plane P2 when the door 14 is in the deployed position. This allows the door 14 to move to the stowed position, as shown in FIG. 4. In use, during taxi, take-off and landing (TTL), the doors 14 are stowed (see FIG. 4B) away and fastened to the adjacent wall portion 20. Accordingly, in a preferred embodiment, a latch 22 is included and includes components on the door 14 and the wall portion 20 or any other component to which the door 14 may be secured. In a preferred embodiment, the latch 22 is a quarter-turn or nested retainer type latch. However, any type of latch, lock or the like is within the scope of the present invention. In a preferred embodiment, the wall portion 20 includes a first cut-out 23 defined therein in which the door 14 is positioned when in the stowed position.

As shown in FIG. 5, in a preferred embodiment, the jamb member 16 includes a channel 24 running vertically therethrough that houses an LED strip 26 (or other lighting device) and a lens 28 or lenses for dispersing the light as desired. In another embodiment, the lens can be omitted. In a preferred embodiment, the lens 28 is offset, as shown in FIG. 5 so that the light from the LEDs 26 is directed toward the door 14.

In a preferred embodiment, the hinge assemblies 18 are self-centering and include a spring or cam mechanism or the like such that when passengers pass through the partition 10, the doors 14 swing back to the deployed position. In a preferred embodiment, the spring or cam mechanism is designed such that the doors 14 will open due to a passenger walking therethrough. In an embodiment, a detent that holds the doors 14 in the centered position is provided.

In an exemplary embodiment, marketplace and lavatory monuments 108 and 110 include 1" thick and 6" long wall portions 20 extending inboard therefrom. The wall portions 20 include doors 14 that extend inboard another 6" and include a self-centering, dampened hinge assembly 18.

FIG. 6 shows another embodiment of a divider assembly 40 that includes a hinge assembly 42 that includes a dampening elastomer member 44 that extends between the door 14 and the jamb member 16. In this embodiment, the jamb member includes a rotatable portion 46 that allows the door 14 together with the dampening elastomer member 44 to move between the stowed (showed in hidden lines in FIG. 6) and deployed (shown in solid lines in FIG. 6) positions. In a preferred embodiment, the elastomer member 44 operates similar to a living hinge, where a flexible plastic is used as the hinge that flexes when a passenger walks through the aisle in the deployed position. Preferably, the hinge assembly 42 includes a pin hinge that moves the door assembly between the TTL position and the deployed position.

FIG. 7 shows another embodiment of a divider assembly 60 that includes a hinge assembly 62 that includes a double hinge member 64 that pivotally connects the door 14 and the jamb member 16 and allows the door 14 to move between the stowed (showed in hidden lines in FIG. 7) and deployed (shown in solid lines in FIG. 7) positions.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. Further, any specific materials noted herein are only examples: alternative implementations may employ differing materials.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A partition configured to be positioned within an aircraft, the partition comprising:
    a first divider assembly that includes a first wall portion having a first jamb member secured to an inboard surface thereof and a first door hingedly connected to the first jamb member, wherein the first jamb member includes a first LED light strip lighting that illuminates the first door, wherein the first jamb member includes a vertically extending channel running therethrough, wherein the first LED light strip is disposed in the channel and is positioned to direct light toward an outboard surface of the first door, wherein the first LED light strip is positioned adjacent a first lens, and wherein the first door is movable between a stowed position and a deployed position, and
    a second divider assembly that includes a second wall portion having a second jamb member secured to an inboard surface thereof and a second door hingedly connected to the second jamb member, wherein the second jamb member includes a second LED light strip lighting that illuminates the second door, wherein the second jamb member includes a vertically extending channel running therethrough, wherein the second LED light strip is disposed in the channel and is positioned to direct light toward an outboard surface of the second door, wherein the second LED light strip is positioned adjacent a second lens, wherein the second door is movable between a stowed position and a deployed position, and wherein the second door is spaced apart from the first door.

2. The partition of claim 1 wherein the first wall portion defines a center plane and the first door defines a center plane, wherein the center plane of the first wall portion is not aligned with the center plane of the first door when the first door is in the deployed position, wherein the second wall portion defines a center plane and the second door defines a center plane, wherein the center plane of the second wall portion is not aligned with the center plane of the second door when the second door is in the deployed position.

3. The partition of claim 2 wherein the first lens is offset from the center plane of the first wall portion, and wherein the second lens is offset from the center plane of the first wall portion.

4. The partition of claim 3 wherein the first wall portion includes a first cut-out defined therein, wherein the first door is positioned in the first cut-out portion in the stowed position, wherein the second wall portion includes a second cut-out defined therein, wherein the second door is positioned in the second cut-out portion in the stowed position.

5. An aircraft comprising:
    an interior that is divided into at least first and second class sections, and
    a partition that is positioned between the first class section and the second class section, wherein the partition includes
        a first divider assembly that includes a first wall portion having a first jamb member secured to an inboard surface thereof and a first door hingedly connected to the first jamb member, wherein the first jamb member includes a first LED light strip lighting that illuminates the first door, wherein the first jamb member includes a vertically extending channel running therethrough, wherein the first LED light strip is disposed in the channel and is positioned to direct light toward an outboard surface of the first door, wherein the first LED light strip is positioned adjacent a first lens, and wherein the first door is movable between a stowed position and a deployed position, and
        a second divider assembly that includes a second wall portion having a second jamb member secured to an inboard surface thereof and a second door hingedly connected to the second jamb member, wherein the second jamb member includes a second LED light strip lighting that illuminates the second door, wherein the second jamb member includes a vertically extending channel running therethrough, wherein the second LED light strip is disposed in the channel and is positioned to direct light toward an outboard surface of the second door, wherein the second LED light strip is positioned adjacent a second lens, wherein the second door is movable between a stowed position and a deployed position, and wherein the second door is spaced apart from the first door,
    wherein at least a portion of the aisle is defined between the first and second divider walls.

6. The aircraft of claim 5 wherein the first wall portion defines a center plane and the first door defines a center plane, wherein the center plane of the first wall portion is not aligned with the center plane of the first door, wherein the second wall portion defines a center plane and the second door defines a center plane, wherein the center plane of the second wall portion is not aligned with the center plane of the second door.

7. The aircraft of claim 6 wherein the first lens is offset from the center plane of the first wall portion, and wherein the second lens is offset from the center plane of the first wall portion.

8. The aircraft of claim 7 wherein the first wall portion includes a first cut-out defined therein, wherein the first door is positioned in the first cut-out in the stowed position, wherein the second wall portion includes a second cut-out defined therein, wherein the second door is positioned in the second cut-out in the stowed position.

9. A method performed in an aircraft interior that includes a the partition of claim 1 that comprises a first divider assembly that includes a first wall portion having a first jamb member secured to an inboard surface thereof and a first door hingedly connected to the first jamb member, wherein the first jamb member includes first lighting that illuminates the first door, and a second divider assembly that includes a second wall portion having a second jamb member secured to an inboard surface thereof and a second door hingedly connected to the second jamb member, wherein the second jamb member includes second lighting that illuminates the second door, and wherein the second door is spaced apart from the first door, the method comprising the steps of:
    moving the first door from a stowed position to a deployed position after the aircraft has passed above a predetermined altitude,
    moving the second door from a stowed position to a deployed position after the aircraft has passed above a predetermined altitude, moving the first door from the deployed position to the stowed position after the aircraft has passed below a predetermined altitude, and moving the second door from the deployed position to the stowed position after the aircraft has passed below a predetermined altitude.

10. The method of claim 9 further comprising the step of illuminating the first and second doors.

11. The method of claim 10 wherein the first door is positioned in a first cut-out defined in the first wall portion in the stowed position, and wherein the second door is positioned in a second cut-out defined in the second wall portion in the stowed position.

12. The method of claim 10 wherein the partition is positioned within the aircraft interior between a first class section and a second class section.

* * * * *